Aug. 25, 1925. 1,551,451
J. W. ANDERSON ET AL
MULTIPLE VIEW CAMERA
Filed Jan. 9, 1924 6 Sheets-Sheet 3

Inventors
JAMES W. ANDERSON.
LYLE RENNICK.
FRANK ZUECKERT

Patented Aug. 25, 1925.

1,551,451

UNITED STATES PATENT OFFICE.

JAMES W. ANDERSON, OF SAN FRANCISCO, AND LYLE RENNICK AND FRANK ZUECKERT, OF BERKELEY, CALIFORNIA, ASSIGNORS TO ANDERSON MANUFACTURING COMPANY, OF SAN FRANCISCO, CALIFORNIA, A CORPORATION OF CALIFORNIA.

MULTIPLE-VIEW CAMERA.

Application filed January 9, 1924. Serial No. 685,172.

*To all whom it may concern:*

Be it known that we, JAMES W. ANDERSON, LYLE RENNICK, and FRANK ZUECKERT, citizens of the United States, residing in the city and county of San Francisco, Berkeley, county of Alameda, and Berkeley, county of Alameda, and State of California, have invented new and useful Improvements in Multiple-View Cameras, of which the following is a specification.

This invention relates to multiple view cameras and particularly pertains to certain improvements over the type of camera disclosed in United States Letters Patent issued to James W. Anderson, No. 1,369,515, dated February 22, 1921.

In general, these cameras have the usual lens carrying casing, wherein a plate holder is mounted for horizontal and vertical movement and is operated in synchronism with a rotary shutter to present a new portion of the sensitized surface of the plate for exposure each time the shutter uncovers the lens. The plate is stationary during the period that the lens is uncovered.

Cameras of this type are extensively used for portrait work, the advantages being that a series of different positions may be photographed quickly, which insures a better chance of obtaining one suitable to the subject.

It is the principal object of the present invention to generally improve the construction and operation of cameras of this type.

In carrying out this object, we provide a camera of the type referred to wherein the size and number of pictures which may be taken on one plate is optional. The mechanism for operating the plate holder and shutter is preferably driven by an electric motor through a normally ineffective driving connection between the motor and the operating mechanism. When the camera is in use the motor may be in constant operation and by manipulating the normally ineffective driving connection, pictures may be taken at intervals of optional length or in rapid succession.

In photography, the best results are obtained when the subject is at ease, which in the majority of cases is insured only when he is unaware of the fact that he is being photographed. Persons uninitiated are apt to show considerable lack of poise and nervousness the instant the motor of the camera starts. By manipulating the driving connection, we are enabled to keep the motor in continuous operation without operating the plate holder and without in any way exposing the sensitized plate to the light. In this way the subject becomes accustomed to the operation of the camera and having been assured that he is not being photographed as yet, becomes more natural in his position. Then when he is at ease the operator establishes a driving connection between the motor and the operating mechanism without being observed by the subject, and the camera starts photographing. In case the subject becomes out of focus or should the operator desire that he change positions, the connection between the motor and the operating mechanism may be interrupted for a desired period of time. In this manner various positions or poses may be photographed on one plate.

One form which the present invention may assume is exemplified in the following description and illustrated by way of example in the accompanying drawings, in which:

Fig. 8 is a perspective view of the plate holder.

Referring more particularly to the accompanying drawings, 10 indicates a suitable camera casing having removable front and rear panels 11 and 12. The front panel is fitted with a lens holder 14 which is mounted on a vertically adjustable slide 15

Fixed in the casing intermediate the front and rear panels is a partition wall 16 which is formed with an aperture 17 which is in alignment with the lens holder on the front panel. Within the casing and interposed between the aperture 17 and the lens holder on the front panel 11 is a rotary shutter 18 having an adjustable opening 18ª through which, when the shutter is revolved, light may pass intermittently from the lens through the aperture 17 to a sensitized plate at the rear of the partition. The rotary shutter 18 is fixed upon a shaft carried by the partition wall.

The dimensions of the aperture 17 is controlled by horizontally shiftable plates 19 slidably mounted on the partition at opposite sides of the aperture and a vertically shiftable plate 20 also mounted on the partition and disposed above the aperture 17. The latter is formed with a spring arm 21 which is fitted at its lower end with a transverse pin 22 which is adapted to engage notches formed in flanges 23 at the adjacent edges of the horizontally shiftable plates 19. A vertical scale 24 is arranged on one of these plates adjacent the notches mentioned and a horizontal scale 25 is arranged on the partition wall at the rear of the plates 19. These scales are calibrated and the numbered calibrations thereon indicate the different positions the shiftable plates 19 and 20 may be set to obtain different numbers of exposures in transverse rows on the sensitized plate. The setting of the plates 19 and 20 regulates the dimensions of the aperture to correspond with the number of exposures desired on the sensitized plate.

Figure 7:
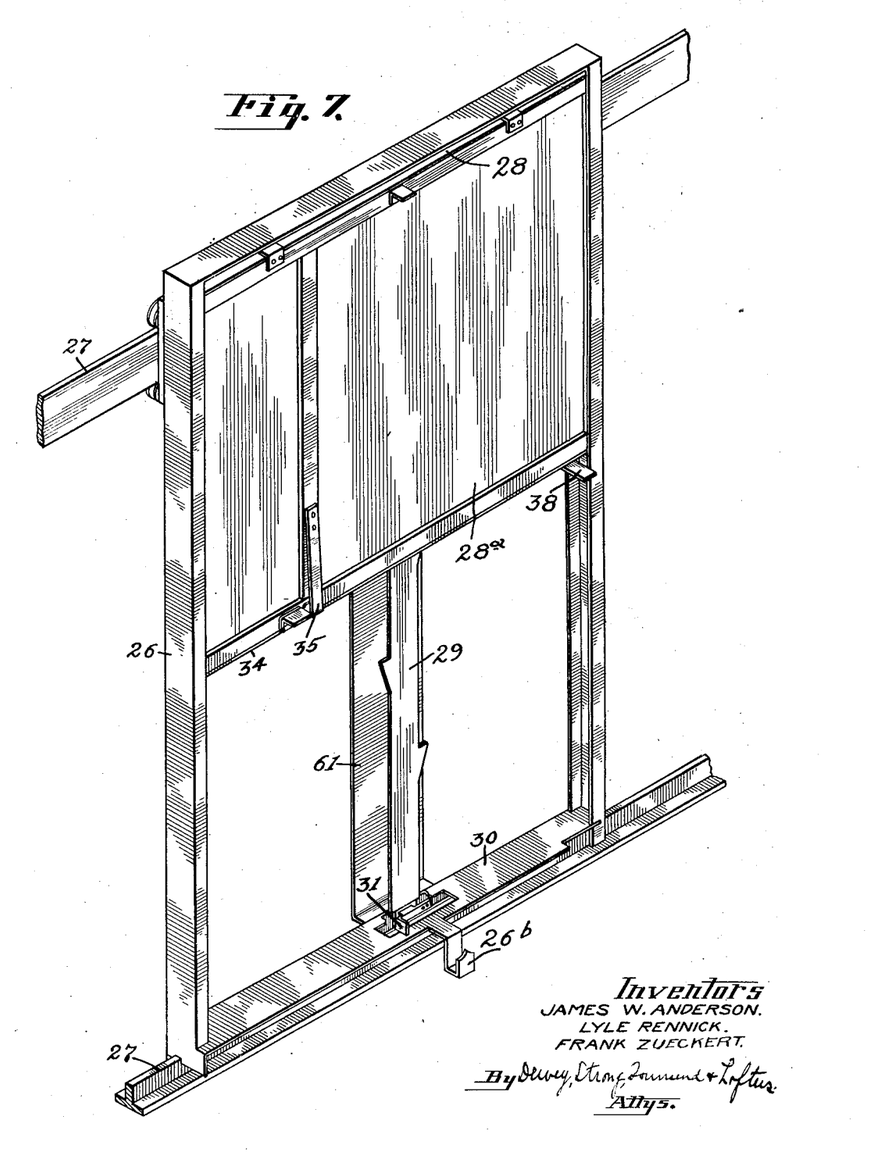
Fig. 7 is a perspective view of the plate holder carriage.

Immediately in the rear of the partition wall is a horizontally reciprocating carriage mechanism comprising a carriage 26 which is slidable on horizontal rails or guides 27 at the top and bottom of the casing as shown in Fig. 7. A vertically slidable plate holder frame 28 is carried by the carriage 26 and receives a plate holder 28ª. The latter is adapted to contain a sensitized dry plate. The vertical dimension of the plate holder frame 28 is such that it may be elevated bodily to the upper portion of the carriage 26, so that the bottom edge of the sensitized plate within the holder 28ª becomes approximately even with the bottom of the aperture 17 in the partition wall.

Removably fixed at the front of the carriage 26 is a vertically disposed toothed rack 29. The ends of this rack enter slots formed in horizontal bars 30 extending horizontally of the carriage 26. A spring clip 31 on the bottom of the carriage 26 is adapted to latch the toothed rack 29 in place.

The plate holder frame 28 has on its lower portion a horizontally disposed slidable bar 32 carrying at each end inwardly projecting detents 32ª. The spacing of the detents 32ª is equal to the width of the rack 29 and one tooth thereon. At each end of the travel of the carriage 26 is a tripping flange 33, which flanges are fixed to the partition wall. These flanges are adapted to be engaged by lugs 33ª on the ends of the slidable bar 32 when the carriage reaches the ends of its travel, whereby the slidable bar 32 will be shifted in a direction to release one of the detents from its tooth and allow the plate-holder frame to drop downwardly until the detent on the opposite side of the slidable bar engages the succeeding tooth on the rack 29. The plate-holder frame will thus be lowered the distance of one tooth on the rack 29 at each end of the movement of the carriage. The distance the plate-holder frame is lowered each time is equivalent to the height of the rows of exposures on the sensitized plate.

Slidably fitted to the front of the plate holder so as to effectively cover a sensitized plate therein, is a slide 34 which may be latched in closed position by means of a suitable catch 35. When positioning the plate holder in the camera the rear panel 12 is removed and the plate holder 28ª with the slide 34 in place is positioned within the frame 15 and removably held therein by means of a spring-pressed latch 35ª hinged to one of the vertical side bars of the carriage. Thereafter the carriage mechanism is moved to the extreme right hand position, referring to Fig. 6, and the plate holder frame is raised to the upper limit of its movement. The rear panel 12 of the casing may then be replaced.

To remove the slide when it is desired to expose the sensitized plate, we arrange an endless chain 36 at one end of the camera casing. This chain is fitted with a bifurcated member 37 so positioned that it may be engaged with a lug 38 on the slide 34 of the plate holder 28ª.

Figures 2, 3:
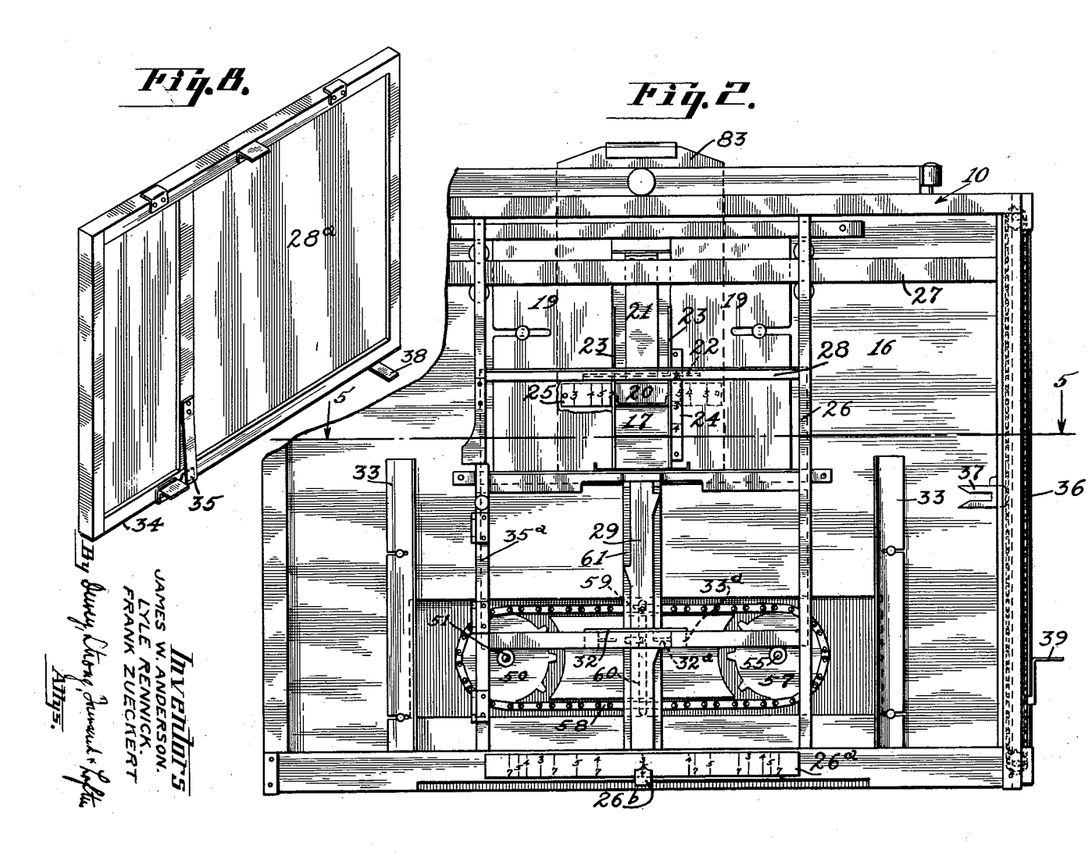
Fig. 2 is a view in rear elevation of the camera with the rear panel removed disclosing the plate holder operating mechanism.
Figs. 3 and 4 are enlarged fragmentary views disclosing the driving connection between the motor and the shutter and plate holder operating mechanism in different positions.
Figure 3:
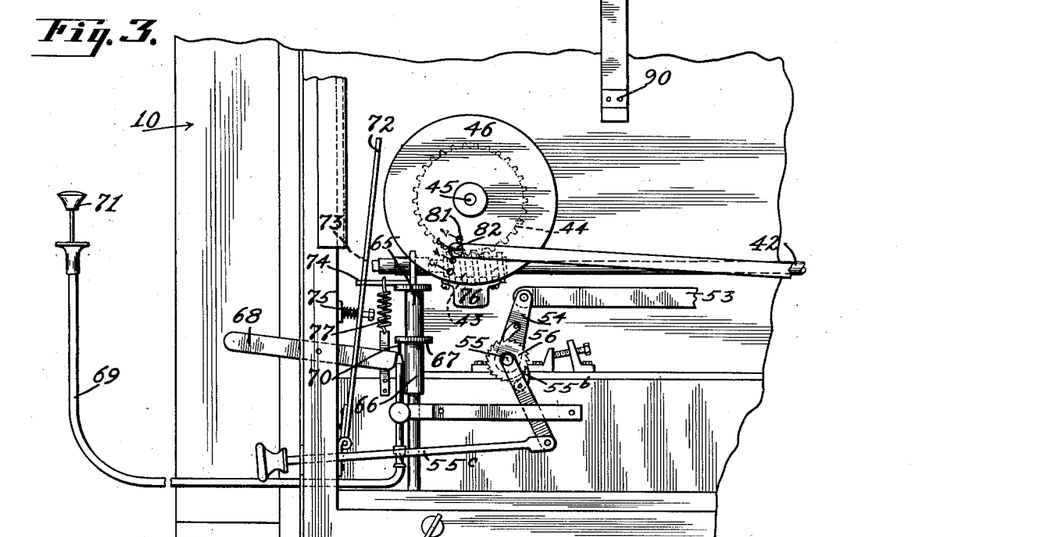
Figure 6:
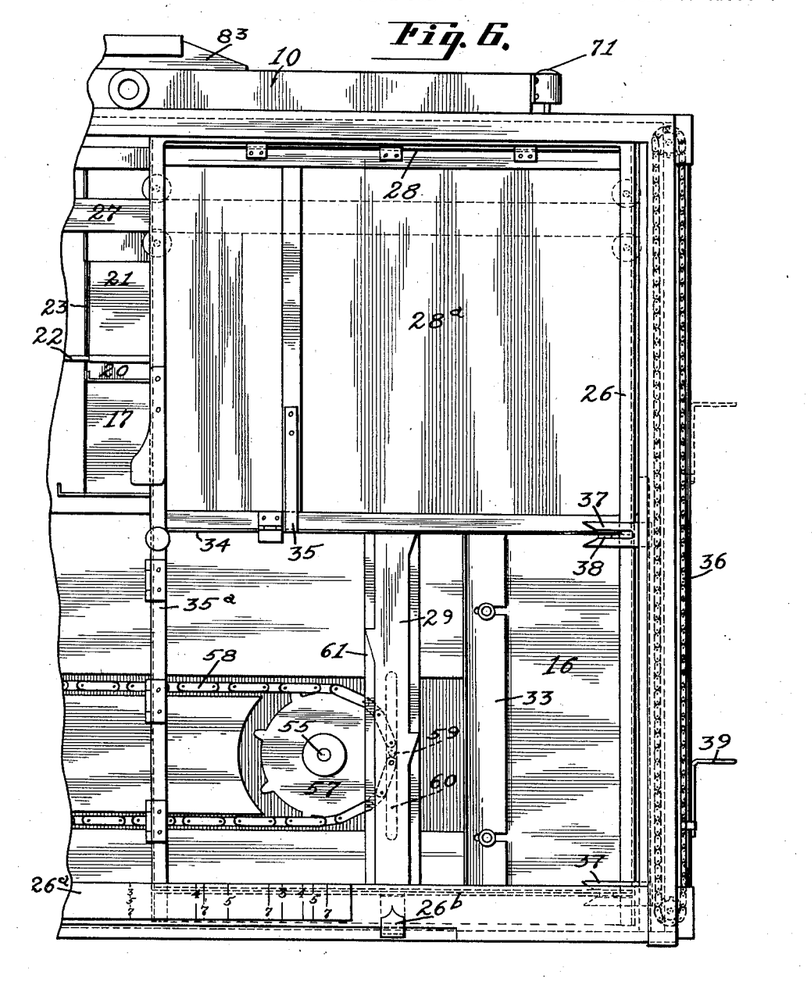
Fig. 6 is an enlarged fragmentary view in rear elevation of the rear panel removed and disclosing the carriage and plate holder in starting position.

When the plate holder has been raised to its upward limit of movement at the right of the casing, referring to Fig. 6, it will be held in position by means of the toothed bar and the detents. The lug 38 is then placed in engagement with the member 37 and the catch 35 which holds the slide in place on the plate holder may then be released and the slide may be lowered with respect to the plate holder to uncover the sensitized plate therein lowering the bifurcated member. This may be accomplished by means of the chain 36 which may be operated by a handle 39 located exteriorly of the casing as shown in Fig. 2.

The carriage mechanism may then be reciprocated through suitable operating mechanism, and the plate holder will be successively lowered step by step through the escapement mechanism as described to present the sensitized plate therein before the aperture 17. The toothed rack controlling the lowering of the plate holder frame is detachable so that other racks having different number of teeth may be readily substituted whereby to regulate the amount of shifting movement of the plate holder 28$^a$ for the accommodation of a greater or less number of horizontal rows of exposures.

For determining the position of the plate holder with respect to the aperture 17 when the rear panel 12 is in place, we have arranged a scale 26$^a$ at the rear and bottom of the camera casing. A pointer 26$^b$ is fixed on the carriage frame and projects through a slot in the bottom of the camera casing to cooperate with the scale 26$^a$ which is calibrated and numbered to indicate the position of the plate holder with respect to the aperture 17.

Figure 1:
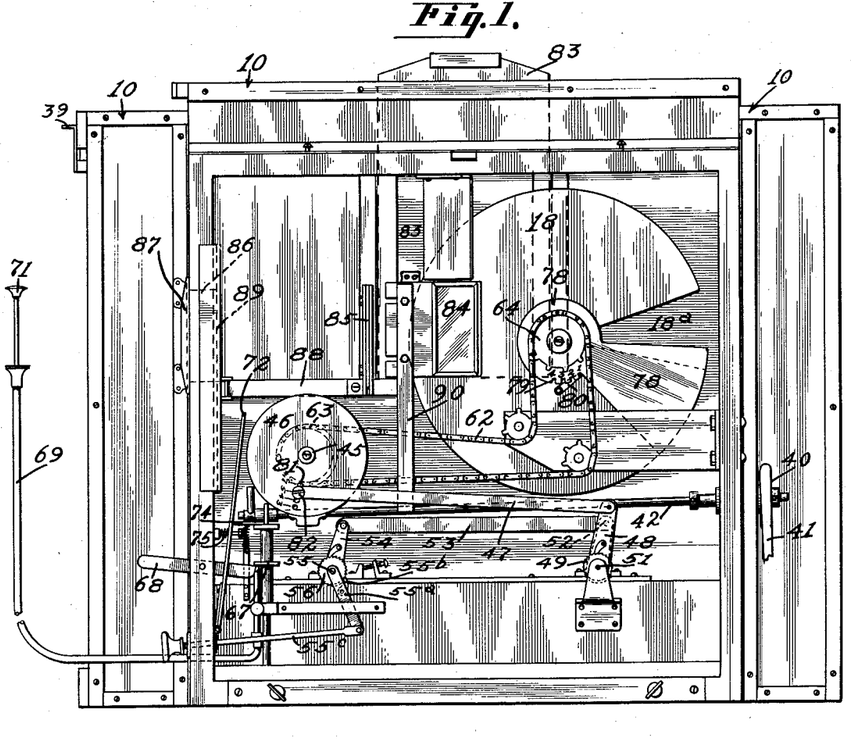
Fig. 1 is a view in front elevation of a camera embodying our invention with the front panel removed.

To operate the carriage 26 we provide a driving pulley 40 which may be connected by a belt 41 to an electric motor or other suitable driving means (not shown). The pulley mentioned is fixed on a horizontally disposed shaft 42 which extends horizontally of the casing as shown in Fig. 1 and in front of the partition wall. This shaft is journaled at its outer end only in the side of the casing in a manner whereby its inner end may be raised and lowered. This inner end of the shaft is fitted with a worm 43 which is adapted to mesh with a worm gear 44 fixed on a shaft 45 carried by the partition wall.

Also fixed on the shaft 45 is a trip wheel 46. A connecting rod 47 connects with this wheel at a point thereon eccentric with respect to its axis of rotation. This connecting rod extends to a rock arm 48, which arm, through suitable pawl and ratchet mechanism 49, is adapted to impart an intermittent rotating movement to a sprocket wheel 50 mounted at the rear side of the partition wall through a shaft 51 carried by the partition wall. Also fixed on this shaft in alignment with the rock arm 48 is a second arm 52 which connects by means of a link 53 to a similar arm 54 mounted on a shaft 55, carried by the partition wall. This arm 54 is operatively connected to the shaft 55 through means of a pawl and ratchet mechanism 56. On the rear side of the partition wall, the shaft 55 is fitted with a sprocket wheel 57. Referring to Fig. 2 it is seen that a continuous sprocket chain 58 is led over the sprocket wheels 50 and 57. This chain 58 is fitted with a laterally extending lug 59 on its rear side, which lug operates in a vertical slot 60 formed in a vertical bar 61 fixed to the carriage 26. Therefore, when the chain 58 is driven, the carriage 26 will be reciprocated horizontally of the camera casing.

For the purpose of permitting the carriage 26 to be moved without driving the trip wheel and thus operating the shutter 18, we provide a crank arm 55$^a$ which is pivoted at one end on the shaft 55. This arm carries a pawl 55$^b$ for operating the ratchet wheel on the shaft 55. The other end of the arm is connected with a push rod 55$^c$ which extends through the side wall of the casing. By reciprocating this arm the shaft 55 will be driven and will drive the carriage operating chain 58 through the sprocket 57.

Figure 4:
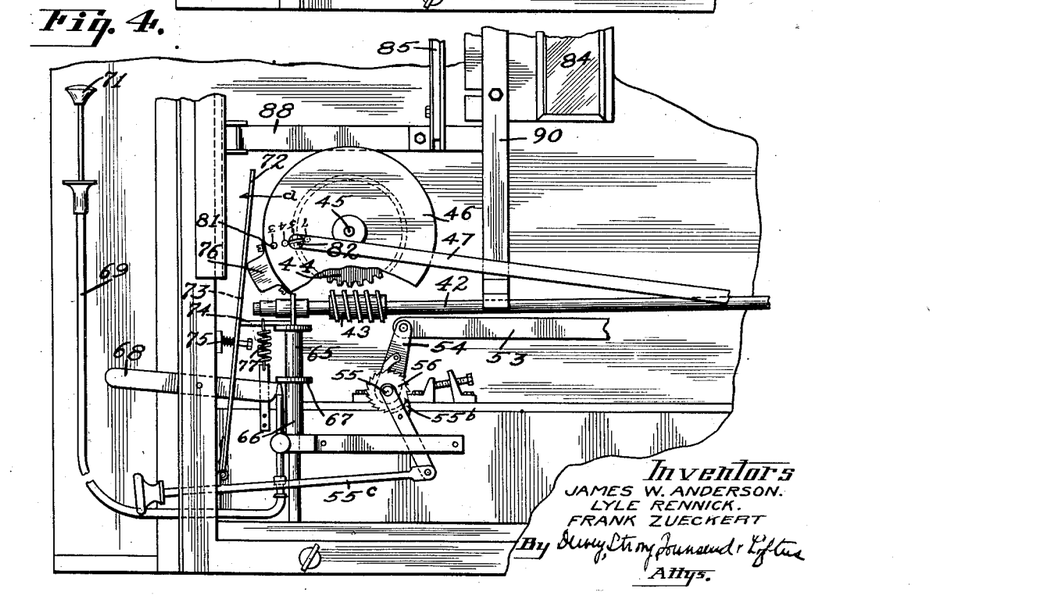
Figure 5:
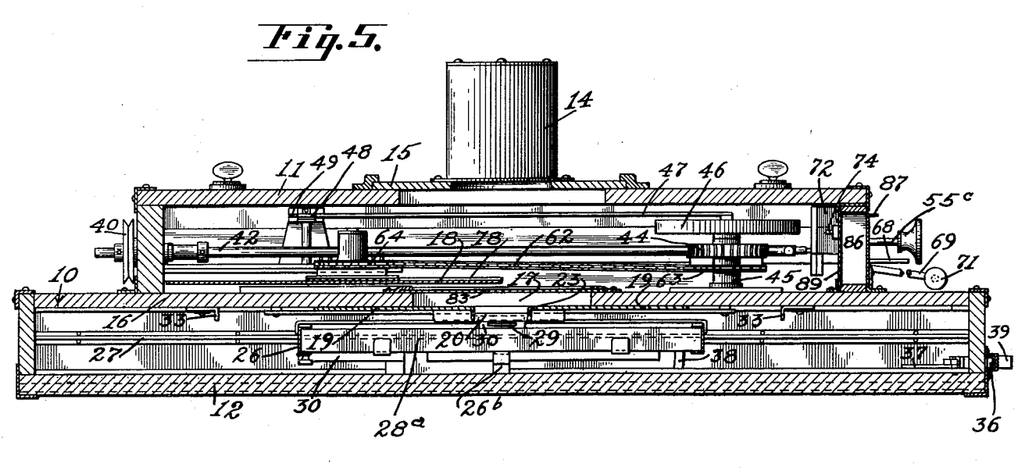
Fig. 5 is an enlarged plan section through the camera taken on line 5—5 of Fig. 2.

The shutter 18 is driven in synchronism with the chain 58 through an endless chain 62 which is led over a sprocket on the trip wheel shaft and a sprocket 64 on the shaft of the shutter. To interrupt the operation of the shutter 18 and the carriage 26 after each exposure, we provide automatically operating means for disengaging the worm 43 on the pulley shaft 42 from the worm gear 44 on the trip wheel shaft 45. The means mentioned is clearly illustrated in Figs. 3 and 4 and comprises a connection between the end of the pulley shaft 45 and a vertically shiftable sleeve 65. This sleeve is slidably mounted on a stationary vertically arranged stationary rod 66 which is fixed to the partition wall. The sleeve 65 mentioned is formed with a collar 67 with which a pivotal operating lever 68 engages. This lever projects through the wall of the casing as shown in Fig. 4 so that it may be depressed to move the sleeve 65 upwardly and place the worm on the pulley shaft into engagement with the worm wheel on the trip wheel shaft.

Also for operating the sleeve 65, we provide an encased flexible cable 69 which connects to a vertically reciprocable pin 70 arranged adjacent the sleeve. The outer end of the flexible cable is fitted with a depressible plunger 71 for causing the cable to vertically reciprocate the pin 70 to operate the sleeve 65.

One revolution of the shutter 18 and an accompanying step of advance of the carriage 26 causes one exposure of the sensitized plate. To maintain the worm on the pulley shaft with the worm wheel on the trip wheel shaft to drive the trip wheel one revolution and thus cause one exposure of the sensitized plate, we provide a hinged member 72 which is formed with a latching shoulder 73. This latching shoulder 73 is adapted to be engaged by a rigid pin 74 extending from the vertically reciprocable sleeve 65 by which the end of the pulley shaft 42 is raised and lowered. When the pulley shaft is raised to engage the worm gear 44, the hinged member 72 will swing outwardly due to a compression spring 75 and dispose the latching shoulder 73 beneath the rigid pin 74. This will support the pulley shaft in an elevated position with the worm 43 in mesh with the worm gear 44 until one complete revolution of the trip wheel has been made.

To automatically disengage the pin 74 from the shoulder 73 on the member 72 and thereby release the pulley shaft so that the worm 43 thereon will disengage from the worm gear 44 on the trip wheel shaft, the trip wheel is fitted with a cam member 76 which is adapted to engage the hinged member 72 at the end of each rotation of the trip wheel. Such engagement will swing the member 72 in the direction of the arrow —a— in Fig. 4 and release the rigid pin from engagement with the latching shoulder on the hinged member. The action of a tension spring 77 will then cause the pulley shaft 42 to lower and disengage the worm 43 thereon from the worm gear 44 on the trip wheel shaft.

By the provision of the trip mechanism described, the operator may take the exposures singly or in rapid succession. It is obvious that the operator may interrupt the operation of the camera during any period of its operation should the subject become out of focus.

To regulate the size of the opening in the rotary shutter 18 to give the desired amount of exposure we fit the shutter with a movable segment 78. This segment is formed with four notches 79 which are numbered 1, 2, 3 and 4, and are adapted to be engaged by a latch member 80 to prevent displacement of the segment when the shutter is rotated.

When it is desired to take four rows of pictures the shiftable plate 20 is lowered until the transverse pin 22 thereon engages the last notch, or that indicated 4 on the calibrated scale 24. A toothed rack 29 with four teeth is then placed in proper position as described. When it is desired to take two or three rows of pictures, racks 29 with a corresponding number of teeth thereon are inserted and transverse pin 22 is engaged with the proper notch on the flanges of the shiftable plates 19.

To regulate the number of pictures in each row, the horizontally shiftable plates 19 may be moved toward or away from each other a desired amount. For example, should five exposures in a row be desired the shifting slides are separated until their adjacent edges each register with the calibration 5 on the scale 25. To regulate the step by step movement of the carriage 26 across the aperture 17 to correspond with the width of the aperture 17 in the partition wall, we form the trip wheel with four tapped openings 81 which are in radial alignment. The end of the connecting rod may be connected to four different radial points on the trip wheel by engaging a thumb screw 82 with either of the four tapped openings mentioned. Should the horizontally shiftable plates 20 be set at 5 on the calibrated scale, it is necessary that the carriage frame traverse across the aperture in five steps. Therefore, by setting the end of the connecting rod at the tapped opening indicated at 5 on the trip wheel numbered 5, the stroke of the connecting rod will be such as to cause the carriage frame to travel across the shutter aperture in the partition wall in five equal intermittent steps.

Should it be desired to take seven pictures in a row on the plate, the shiftable plates 20 are spread until their edges register with the numeral 7 on the calibrated scale and the end of the connecting rod is connected to the tapped hole on the trip wheel also numbered 7. The carriage frame will then traverse across the shutter aperture in the partition wall in seven equal intermittent steps.

As stated, one revolution of the trip wheel causes one exposure to be made on the plate, inasmuch as it revolves the shutter one complete revolution and advances the carriage 26 one step. The trip wheel drives the shutter through the medium of the sprocket 63 on the trip wheel shaft and the sprocket 64 of equivalent diameter on the shutter shaft, over which sprockets the continuous driving chain 62 is led. Therefore, one revolution of the trip wheel will revolve the shutter one revolution and cause the opening in the latter to permit light from the lens to pass through the aperture 17 in the partition wall, thus causing one exposure of the plate.

The operation of the shutter 18 and the carriage 26 is so timed that when the shutter uncovers the aperture 17 in the partition wall, the said carriage will not be in motion.

We provide means for closing the aperture 17 in the partition wall when focusing. This means comprises a vertically shiftable slide 83 arranged against the partition wall in front of the aperture 17. This slide 83 carries a reflecting mirror 84 and a ground glass 85. The mirror 84 is arranged on an angle so that the subject appearing in front of the lens will be reflected on the ground glass.

Formed at the side of the casing is an opening 86 which is normally covered by a spring pressed swinging door 87. When the vertical shiftable slide is in its lowermost position the mirror will be in alignment with the lens and the ground glass will be in alignment with the aperture mentioned, and the subject may be seen on the ground glass through the said aperture. When in this position the slide fully covers the aperture 17 in the partition wall for preventing light from penetrating therethrough and ruining the plate. The slide 83 is fitted with a horizontal arm 88, the outer end of which carries a covering plate 89 for covering the opening 86. When the slide is in its uppermost position the covering plate 89 will be raised and will prevent the accidental admission of light through the opening 86 in the side of the casing.

Also carried by the vertical shiftable slide 83 is an outwardly projecting arm 90 which when the slide 83 is in its lowermost position is adapted to engage the pulley shaft 42 as shown in Fig. 4 to maintain the worm 43 thereon out of mesh with the worm gear 44 on the trip wheel shaft. This prevents the shutter from being accidentally placed in operation when focusing.

When it is desired to operate the camera after focusing, the slide 83 is vertically moved to its uppermost position, thus releasing the shaft 42 and covering the focusing opening 86 in the side of the casing.

In operation of the device, a sensitized plate is placed in the plate holder 28ª and the latter is arranged in the plate holder frame 28 in the carriage 26. The plate holder frame is then raised to its uppermost position at the right hand side of the camera, referring to Fig. 6. The lug 38 on the slide 34 is then engaged with the bifurcated member 37, after which the rear panel 12 of the camera may be replaced. The handle 39 is then raised to cause the bifurcated member to lower the slide 34 of the plate holder and uncover the sensitized plate therein.

Assuming that the motor is in constant operation and that the pulley shaft 42 is being driven, when the lever 68 or the plunger 71 at the end of the flexible cable 69 is depressed, the pulley shaft 42 will be raised to engage the worm 43 thereon with the worm gear 44 on the trip wheel shaft. The trip wheel will then commence revolving to drive the shutter 18 and oscillate the rock arm 48. This arm as described is intended to operate the sprockets 50 and 57 which carry the operating chain 58. Immediately the trip wheel commences revolving the rock arm 48 will be moved to actuate the operating chain and cause the same to advance the plate holder frame one step across the aperture 17. The opening in the shutter 18 will then uncover the aperture 17 and expose the sensitized plate to the light from the lens. This one operation occurs during one revolution of the trip wheel.

It is believed understood that as soon as the pulley shaft is raised the hinged member 72 acts to latch it in raised position until the trip wheel has made one complete revolution, at which time the cam 76 on the trip wheel will move the hinged member and release the shaft 42. This will permit the tension spring 77 to lower the shaft and interrupt the driving connection between it and the trip wheel.

The succeeding operation is exactly the same, and when one row has been taken the lugs 33ª on the shiftable bar 32 will engage the trip flanges and cause the plate holder frame to drop one tooth on the rack 29 as described. This will place the plate holder 28ª in position so that the second row of exposures may be taken.

While we have shown the preferred form of our invention, as now known by use, we wish it understood that various changes may be made in its construction without departing from the spirit of the claims.

Having thus described our invention, what we claim and desire to secure by Letters Patent is:—

1. In a multiple view camera having a casing formed with an aperture through which light may be admitted, a holder for a photographic plate adapted to be advanced across said aperture step by step, a shutter controlling the admission of light through said aperture, operating mechanism for operating said plate holder and said shutter in synchronism whereby the latter will uncover the aperture after each step of advance of the plate holder, driving means adapted to be constantly driven for driving the operating mechanism, an operative driving connection between said driving means and said operating mechanism, and automatically operating means normally operative to render said driving connection ineffective after each operation of the plate holder and shutter.

2. In a multiple view camera having a casing formed with an aperture through which light may be admitted, a holder for a photographic plate adapted to be advanced across said aperture step by step, a shutter controlling the admission of light through said apperture, operating mechanism for operating said plate holder and said shutter in synchronism whereby the latter will uncover the aperture after each step of advance of the plate holder, a shaft adapted to be constantly driven for driving the operating mechanism, an operative driving connection between said shaft and said operating mechanism, and automatically operating means normally operative to render said connection ineffective after each operation of the plate holder and shutter.

3. In a multiple view camera having a casing formed with an aperture through which light may be admitted, a holder for a photographic plate, means for advancing and returning said holder horizontally across said opening step by step, means automatically effective at each end of the horizontal movement to cause the plate holder to be shifted in a vertical direction, a shutter controlling the admission of light through said aperture, an operating mechanism for operating said plate holder and said shutter in synchronism whereby the latter will uncover the aperture after each step of movement of the plate holder, driving means adapted to be constantly driven for driving said operating mechanism, an operative connection between said driving means and said operating mechanism, and automatically operating means normally operative to render said driving connection ineffective after each operation of the plate holder and shutter.

4. In a multiple view camera having a casing formed with an aperture through which light may be admitted, a holder for a photographic plate, means for advancing and returning said holder horizontally across said opening step by step, means automatically effective at each end of the horizontal movement to cause the plate holder to be shifted in a vertical direction, a shutter controlling the admission of light through said aperture, an operating mechanism for operating said plate holder and said shutter in synchronism whereby the latter will uncover the aperture after each step of movement of the plate holder, driving means adapted to be constantly driven for driving the operating mechanism, an operative driving connection between said driving means and said operating mechanism, and automatically operating means normally operative to render said connection ineffective after each combined operation of the plate holder and shutter, 5. In a multiple view camera having a casing formed with an aperture through which light may be admitted, a holder for a photographic plate adapted to be advanced across said opening step by step, a shutter controlling the admission of light through said aperture, means changing the effective area of said aperture, means for regulating the step by step advancing movement of said plate holder to correspond with the area of said aperture, a shutter controlling admission of light through said aperture, operating mechanism for operating said plate holder and said shutter in synchronism whereby the latter will uncover the aperture after each step of advance of the plate holder.

6. In a multiple view camera having a casing formed with an aperture through which light may be admitted, a holder for a photographic plate adapted to be advanced across said opening step by step, a shutter controlling the admission of light through said aperture, means for changing the effective area of said aperture, means for regulating the step by step advancing movement of said plate holder to correspond with the area of said aperture, a shutter controlling admission of light through said aperture, operating mechanism for operating said plate holder and said shutter in synchronism whereby the latter will uncover the aperture after each step of advance of the plate holder, driving means adapted to be constantly driven for driving the operating mechanism, an operative driving connection between said driving means and said operating mechanism, and automatically operating means normally operative to render said connection ineffective after each combined operation of the plate holder and the shutter.

7. In a multiple view camera having a casing formed with an aperture through which light may be admitted, a holder for a photographic plate adapted to be advanced across said aperture step by step, a rotary shutter controlling the admission of light through said aperture, operating mechanism for operating said plate holder and said shutter in synchronism whereby the latter will uncover the aperture after each step of advance of the plate holder, said operating mechanism including an operating shaft operatively connected to the plate holder and to the shutter, a driving shaft adapted to be constantly driven, an operative driving connection between said shafts, and automatically operating means normally operative to render said connection ineffective after each combined operation of the plate holder and shutter.

8. In a multiple view camera having a casing formed with an aperture through which light may be admitted, a holder for a photographic plate adapted to be advanced across said aperture step by step, a rotary shutter controlling the admission of light through said aperture, operating mechanism for operating said plate holder and said shutter in synchronism whereby the latter will uncover the aperture after each step of advance of the plate holder, said operating mechanism including an operating shaft operatively connected to the plate holder and to the shutter, a driving shaft adapted to be constantly driven, said driving shaft being shiftable, a worm on said driving shaft adapted to mesh with a worm gear on said operating shaft, said driving shaft being operative to engage the worm thereon with said worm gear to form a driving connection between said shafts, and automatically operating means normally operative to disengage the worm on said driving shaft from the worm on the operating shaft after each combined operation of the plate holder and shutter.

9. In a multiple view camera having a casing formed with an aperture through which light may be admitted, a holder for a photographic plate adapted to be advanced across said aperture step by step, a rotary shutter controlling the admission of light through said aperture, operating mechanism for operating said plate holder and said shutter in synchronism whereby the latter will uncover the aperture after each step of advance of the plate holder, said operating mechanism including an operating shaft operatively connected to the plate holder and to the shutter, a driving shaft adapted to be constantly driven, said driving shaft being shiftable, a worm on said driving shaft adapted to mesh with a worm gear on said operating shaft, said driving shaft being operative to engage the worm thereon with said worm gear to form a driving connection between said shafts, automatically operating means normally operative to disengage the worm on said driving shaft from the worm on the operating shaft after each combined operation of the plate holder and shutter, said automatically operating means comprising a latch mechanism for latching said driving shaft into engaging position, and a trip wheel on said operating shaft for releasing said latching mechanism after each combined operation of the plate holder and shutter.

JAMES W. ANDERSON.
LYLE RENNICK.
FRANK ZUECKERT.